No. 753,833. PATENTED MAR. 1, 1904.
A. B. COPLEY.
PORTABLE AND ADJUSTABLE STOCK CHUTE.
APPLICATION FILED OCT. 22, 1903.

NO MODEL. 2 SHEETS—SHEET 1.

Fig. 1

Fig. 2

Witnesses:
L. L. Leibrock
R. H. Orwig

Inventor: Ariel B. Copley,
By Thomas G. Orwig, Attorney

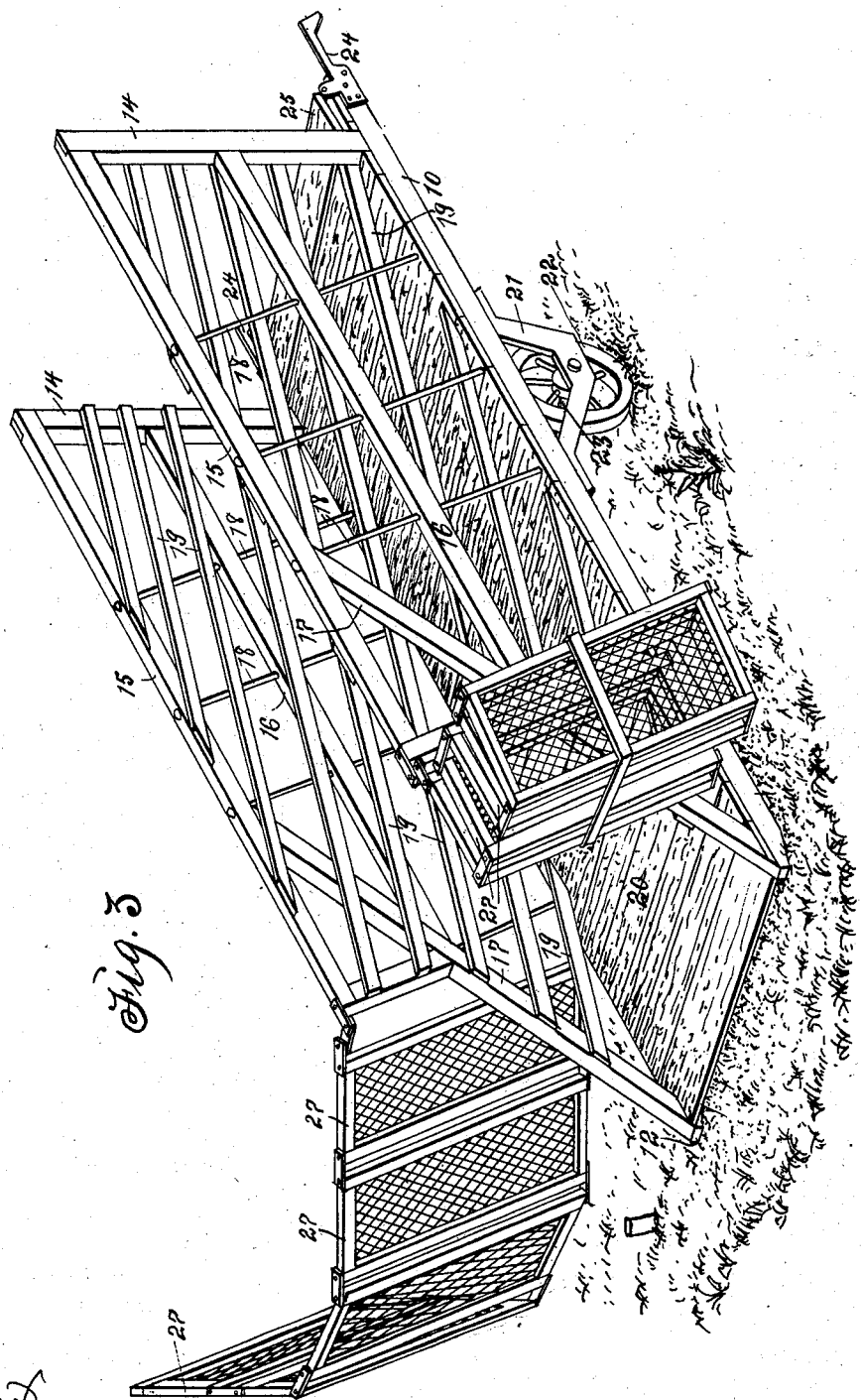

No. 753,833. Patented March 1, 1904.

UNITED STATES PATENT OFFICE.

ARIEL B. COPLEY, OF DES MOINES, IOWA.

PORTABLE AND ADJUSTABLE STOCK-CHUTE.

SPECIFICATION forming part of Letters Patent No. 753,833, dated March 1, 1904.

Application filed October 22, 1903. Serial No. 178,166. (No model.)

*To all whom it may concern:*

Be it known that I, ARIEL B. COPLEY, a citizen of the United States, residing at Des Moines, in the county of Polk and State of Iowa, have invented a new and useful Portable and Adjustable Stock-Chute, of which the following is a specification.

My object is to provide a portable and adjustable stock-chute that can be readily moved about to be connected with wagons and cars to facilitate loading and unloading animals therefrom.

My invention consists in the construction, arrangement, and combination of parts, as hereinafter set forth, pointed out in my claims, and illustrated in the accompanying drawings, in which—

Figure 1 is a side view of the chute, showing it in its normal position and one end resting on the ground as required to produce an inclined plane over which animals can walk in going to and from a wagon or car when the upper end of the chute is connected therewith. Fig. 2 is a bottom view of the chute, showing a jack-screw connected therewith for adjusting the top of the chute relative to the height of a wagon or car as required for connecting the upper end of the chute therewith. Fig. 3 is a perspective view that shows adjustable and foldable sides at the lower end in position as required for directing animals relative to the inclined plane upon which they are to ascend.

The numerals 10 and 12 designate the lower straight pieces, and 13 the cross-pieces, of an oblong frame, about fourteen feet long and four feet wide and about four and one-half feet high. Frames composed of uprights 14, parallel pieces 15 and 16, and inclined pieces 17 are fixed to the side pieces of the horizontal oblong frame by means of iron bars 18, as shown, or in any suitable way to extend vertically in parallel planes, and boards 19 are fixed to their inside faces to produce panels that will prevent animals from getting off the floor 20, fixed to the pieces 15 and 16 of the horizontal frame and bottom of the structure. Axle-bearers 21 are fixed to the bottom of the frame near the center, and wheels 22, fixed to an axle 23, mounted in said axle-bearers, as shown, or in any suitable way, so the frame will be pivotally connected with the axle and wheels. Hooks 24, adapted to serve as hinge-irons, are fixed to the upper ends of the side pieces 10 and 12 to project outward and to engage the floor of a wagon-box or car as required in detachably connecting the chute therewith.

A board or floor extension 25 is hinged to the ends of the side pieces 10 and 12, as shown, or in any suitable way, so it can be folded outward upon the floor of a wagon-box or car, and also inward upon the floor of the chute when not in use for connecting the chute with a wagon-box or car. A jack-screw 26 is pivotally connected with the upper portion of the floor, as shown, or in any suitable way for the purpose of lifting the upper end of the chute as required to adjust its upper end relative to the height of a wagon-box or car as required to facilitate connecting and disconnecting the chute from a wagon-box or car. A spring-catch $a$ is fixed to the under side and center of the upper end of the floor, as shown in Figs. 1 and 2, for detachably engaging the base of the jack-screw to fasten it to the under side of the floor as required to carry it when not in use.

Panel extensions, preferably made of wire in sections 27, hinged together, are hinged to the sides of the lower end portions of the parallel panels of the chute, as shown, or in any suitable way, so they can be compactly folded together and fastened to the chute when not in use and also extended, as shown in Fig. 3 and as required for directing animals upon the chute to walk up thereon.

Having thus described the purpose of my invention and its construction and application to a wagon-box or car and manner of use, its practical utility will be readily understood by farmers and stock dealers and persons familiar with the art to which it pertains, and

What I claim as new, and desire to secure by Letters Patent, is—

1. In a portable stock-chute, an oblong frame having fixed parallel panels at its sides, a fixed floor, axle-bearers on its under side and central portion and traction-wheels mounted in said bearers, hinge-irons having hooks at their ends fixed to the ends of the side pieces of the bottom of the frame to project outward in alinement with said side pieces for connecting the chute with a wagon or car, arranged and combined to operate in the manner set forth for the purposes stated.

2. In a portable stock-chute, an oblong frame having fixed parallel panels at its sides, a fixed floor, axle-bearers on its under side and central portion and traction-wheels mounted in said bearers, hinge-irons having hooks on their ends fixed to the corners of the frame for connecting the chute with a wagon or car and a board or floor-section hinged to said fixed hinge-irons at the end of the frame and floor to extend into a wagon-box or car, arranged and combined to operate in the manner set forth for the purposes stated.

3. A stock-chute having a flat bottom mounted upon wheels and in its normal position an inclined plane and a jack-screw pivotally connected with its bottom to extend downward, and means for fastening the base of the jack-screw to the bottom in the manner set forth for the purposes stated.

4. A stock-chute mounted upon wheels to normally extend in an inclined plane and provided with fixed panels at its sides and foldable adjustable panel extension connected with the lower ends of the fixed panels, for the purposes stated.

5. A portable and adjustable stock-chute comprising a straight oblong frame having fixed panels at its sides and a fixed floor, mounted on two wheels, a jack-screw pivotally connected with the floor, axle-bearers fixed to the under side of the frame near its longitudinal center, wheels mounted in said axle-bearers, hooks on the upper corners of the frame and adjustable panel extensions connected with the fixed panels, arranged and combined to operate in the manner set forth for the purposes stated.

ARIEL B. COPLEY.

Witnesses:
L. L. LEIBROCK,
THOMAS G. ORWIG.